United States Patent [19]
Hayafusa et al.

[11] Patent Number: 5,213,010
[45] Date of Patent: May 25, 1993

[54] DRIVER POWER TRANSMITTING APPARATUS OF TWIN SHAFT EXTRUDERS

[75] Inventors: Nobuyuki Hayafusa, Numazu; Kuniaki Endoh, Susono; Mitsuoki Hatamoto, Mishima; Tokushige Maeda, Numazu; Akiyoshi Kobayashi, Fuji, all of Japan

[73] Assignee: Toshiba Kikai Kabushiki Kaisha, Tokyo, Japan

[21] Appl. No.: 879,206

[22] Filed: May 6, 1992

[30] Foreign Application Priority Data

May 7, 1991 [JP] Japan .................... 3-041270[U]

[51] Int. Cl.⁵ ............................ F16H 17/06
[52] U.S. Cl. ..................... 74/665 GA; 74/421 A; 74/424.6; 74/467
[58] Field of Search ...... 74/665 GA, 665 GD, 665 P, 74/413, 414, 421 A, 421 R, 467, 424.6

[56] References Cited

U.S. PATENT DOCUMENTS

| | | | |
|---|---|---|---|
| 4,261,225 | 4/1981 | Zahradnik | 74/665 GA |
| 4,269,085 | 5/1981 | Anders et al. | 74/665 GA |
| 4,297,917 | 11/1981 | Bauer et al. | 74/665 GA |
| 4,586,219 | 5/1986 | Black et al. | 74/413 X |
| 4,679,461 | 7/1987 | Mizuguchi et al. | 74/665 GA |
| 4,899,620 | 2/1990 | Schiffer | 74/665 GA X |
| 4,940,115 | 7/1990 | Sugden | 74/467 X |
| 5,038,628 | 8/1991 | Kayama | 74/467 X |
| 5,103,689 | 4/1992 | Dollhopf | 74/665 GA |

Primary Examiner—Richard M. Lorence
Assistant Examiner—Benjamin Levi
Attorney, Agent, or Firm—Cushman, Darby & Cushman

[57] ABSTRACT

The driving power transmitting apparatus for use in twin shaft type extruder is constituted by a first screw driven by a power transmission shaft through a coupling member, and a second screw is driven by two parallel sets of idle plane gear, an idle shaft and an idle helical gear and a helical gear secured to the drive end. The two sets of idle plane gear are driven by a plane gear which is mounted on the power transmission shaft to be rotatable. The plane gear is driven by a prime mover through a coupling.

3 Claims, 3 Drawing Sheets

10

DRIVER POWER TRANSMITTING APPARATUS OF TWIN SHAFT EXTRUDERS

BACKGROUND OF THE INVENTION

This invention relates to a driving power transmitting apparatus to screws of a twin shaft extruder for extruding plastic and the like, and more particularly to an improved apparatus capable of simplifying a gear transmission system with no accompanying decrease in the driving power.

In the prior art power transmitting apparatus for rotating the screws of a twin shaft extruder, since the two screws are arranged closely adjacent there has been a limit on the diameter of a gear coupled to the screws. It has been impossible to use a large diameter gear coupled to at least one of the screws.

Since these screws have been designed to generate a large torque by using a large input and a small number of rotations, a gear transmission system as shown in FIGS. 6 and 7 of the accompanying drawings has been used.

In the prior art gear transmission system shown in FIGS. 6 and 7, a first screw 11 is driven by a motor 13 via an input shaft 14 and gears 15 and 16 having relatively large diameters. Since it is impossible to make large the diameter of a gear 17 coupled of a second screw 12, as shown in FIG. 7, gears 17 and 18 (these gears constituting a pair) are provided, and the gear 18 is driven by the gear 15 through a gear 19 and a shaft 20, and between paired gears 17 and 18 are interposed in parallel two sets of gear transmission systems comprising two first idle gears 21 and 22, two idle shafts 23 and 24 and two second idle gears 25 and 26 so as to transmit the transmission torque by dividing it into two halves, thereby transmitting a desired torque under a decrease load acting upon respective teeth of gear 17 as disclosed in the Japanese Laid Open Patent Specification No. 62039/1987.

The prior art apparatus described above comprises paired gears 17 and 18, a gear transmission system including two sets of gear transmission systems (21, 23, 25), (22, 24, 26) provided in parallel between the paired gears 17 and 18 and gears 15, 16 and 19 and shaft 20 so that not only the construction of the apparatus becomes complicated but also the length in the longitudinal direction of the screws becomes large.

SUMMARY OF THE INVENTION

It is an object of this invention to provide a novel driving power transmitting apparatus for use in a twin shaft extruder capable of decreasing the number of gears without decreasing the transmitted torque by improving the gear transmission system and having a compact construction.

According to this invention there is provided driving power transmitting apparatus of a two shaft extruder comprising an input shaft rotated by a prime mover, first and second coupling members provided for one end of the input shaft, a power transmitting shaft coaxial with the input shaft, one end of the power transmitting shaft being connected to the input shaft through the first coupling member, the other end of the power transmitting shaft being connected to a first screw, a plane gear concentrically and rotatably mounted on the power transmitting shaft and connected to the input shaft through the second coupling member, two paired idle plane gears meshing with the plane gear, two parallel idle shafts with their one end connected with the plane gears, two idle helical gears connected to the other ends of the two idle shafts, a helical gear connected to a drive end of a second screw paired with the first screw, the two idle helical gears meshing with the helical gear at substantially symmetrical positions, and teeth of the helical gear being skewed in the same direction as a flight of the second screw.

DESCRIPTION OF THE PREFERRED EMBODIMENT

Figure 1:
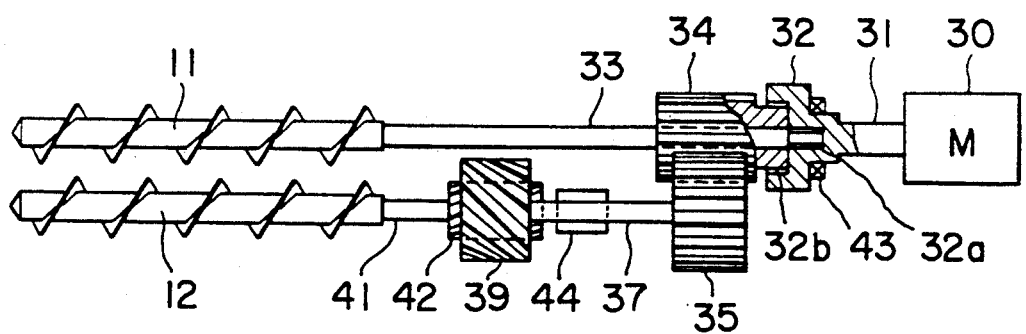
FIG. 1 is a plan view of the driving power transmitting apparatus of a twin shaft extruder constructed in with this invention.

A preferred embodiment of this invention will now be described with reference to FIGS. 1 through 4. As shown in FIG. 1, a first screw 11 and a second screw 12 are arranged in parallel. A prime mover (including a speed reducer) 30 such as an electric motor is connected to the first screw 11 via an input shaft 31, and a motion transmitting shaft 33 coupled to a first coupling member 32a of a coupling unit 32 provided on the fore end of the input shaft 31.

A plane gear 34 is rotatably fit on the drive side end of the motion transmitting shaft 33. The plane gear 34 is coupled with the input shaft 31 via the second coupling member 32b of the coupling unit 32.

Two idle plane gears 35 and 36 (see FIGS. 2 and 3) mesh with the plane gear 34. Similar to the prior art apparatus the idle plane gears 35 and 36 are coupled with idle helical gears 39 and 40 respectively via idle shafts 37, 38. The two idle helical gears 39 and 40 respectively mesh with a helical gear 42 connected to the drive end of the motion transmitting shaft 41 of the second screw 12.

The teeth of plane gear 34 and idle plane gears 35 and 36 extend in parallel with shaft 33, 37 and 38 respectively. The idle helical gears 39 and 40 and helical gear 42 are constructed such that the thrust load of the second screw which occurs at the time of driving would be received by the idle helical gears 39 and 40 through the helical gear 42, and teeth of the helical gear 42 is skewed in the same direction as a flight of the second screw 12.

The first and second screws 11 and 12 are required to rotate in the same direction at the same speed. Denoting the numbers of teeth of gears 34, 35, 36, 39, 40 and 42 by $Z_{34}$, $Z_{35}$, $Z_{36}$, $Z_{39}$, $Z_{40}$ and $Z_{42}$ respectively, the following equations should be held:

$$Z_{35} = Z_{36} \quad (1)$$

$$Z_{39} = Z_{40} \quad (2)$$

Then the following equations hold.

$$\frac{Z_{39} \text{ (or } Z_{40})}{Z_{42}} = \frac{Z_{35} \text{ (or } Z_{36})}{Z_{34}} \quad (3)$$

$$R_{34} = \frac{m1 \cdot Z_{34}}{2}, R_{35} = \frac{m1 \cdot Z_{35}}{2}, \quad (4)$$

$$R_{39} = \frac{m2 \cdot Z_{39}}{2}, R_{42} = \frac{m2 \cdot Z_{42}}{2}$$

where m1 and m2 denote modules of gears 34 and 42, respectively.

Figure 3:
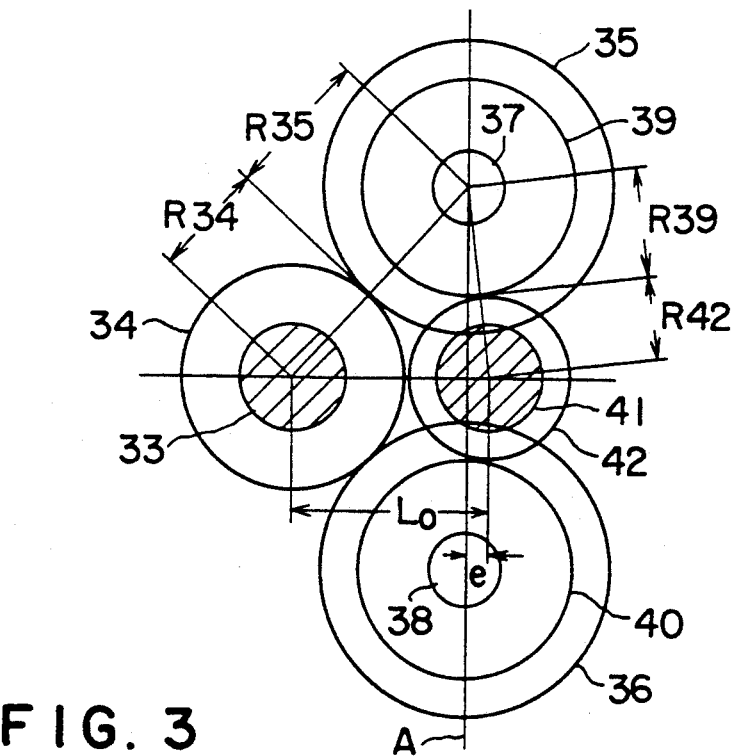
FIG. 3 is an enlarged sectional view taken along a line III—III in FIG. 2.

Denoting the dimensions of various parts shown in FIG. 3, that is, the pitch circle radii of respective gears 34, 35, 39 and 42 by $R_{34}$, $R_{35}$, $R_{39}$ and $R_{42}$, intershaft distance between gears 34 and 42 by $L_0$ and the amount of displacement between a straight line A interconnecting the axes of gears 39 and 40 and the axis of gear 42 by e, it is necessary to satisfy an equation $$(R_{34}+R_{35})^2 - (L_0-e)^2 = (R_{39}+R_{42})^2 - e^2$$

By modifying this equation, we obtain the following equation $$(R_{34}+R_{35})^2 - (R_{39}+R_{42})^2 = L_0(L_0 - 2e) \quad (5)$$

From equations 4 and 5 described above we obtain the following equation:

$$m1^2(Z_{34}+Z_{35})^2 - m3^2(Z_{39}+Z_{42})^2 = 4L_0(L_0 - 2e) \quad (6)$$

By determining the number of teeth of various gears, modules, intershaft distance so as to satisfy equations (3) and (6), it is possible to construct the gear transmitting system described above. Various factors described above can be determined by determining m2 and $Z_{42}$ from the strength of gears and then determining either one of $Z_{42} = Z_{34}$ or m1 = m2.

Figure 2:
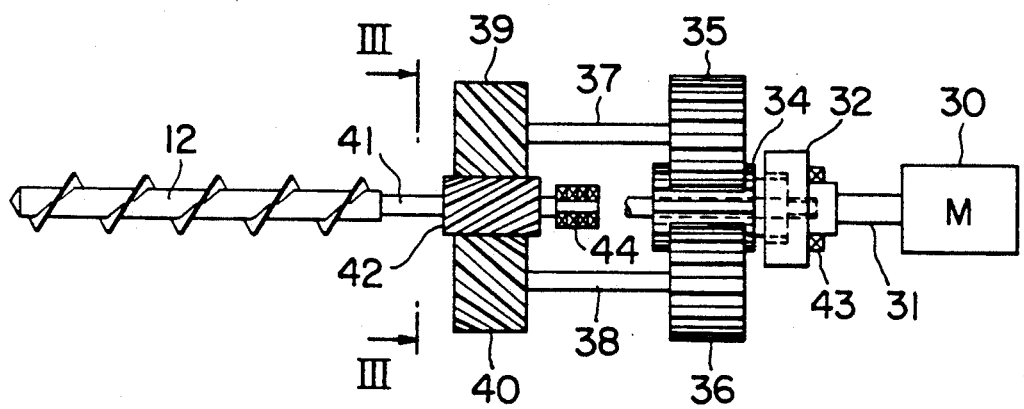
FIG. 2 is a side view of the apparatus shown in FIG. 1.

However, when the values can not be determined as an integral number due to a slight fraction, correct values can be obtained by adjusting the amount of displacement e and the profile shift of gears. Gears 35 and 36 are identical and gears 39 and 40 are also identical. In FIGS. 1 and 2, reference numerals 43 and 44 denote thrust bearings receiving thrust forces of the first and second screws 11 and 12, respectively.

Figure 4:
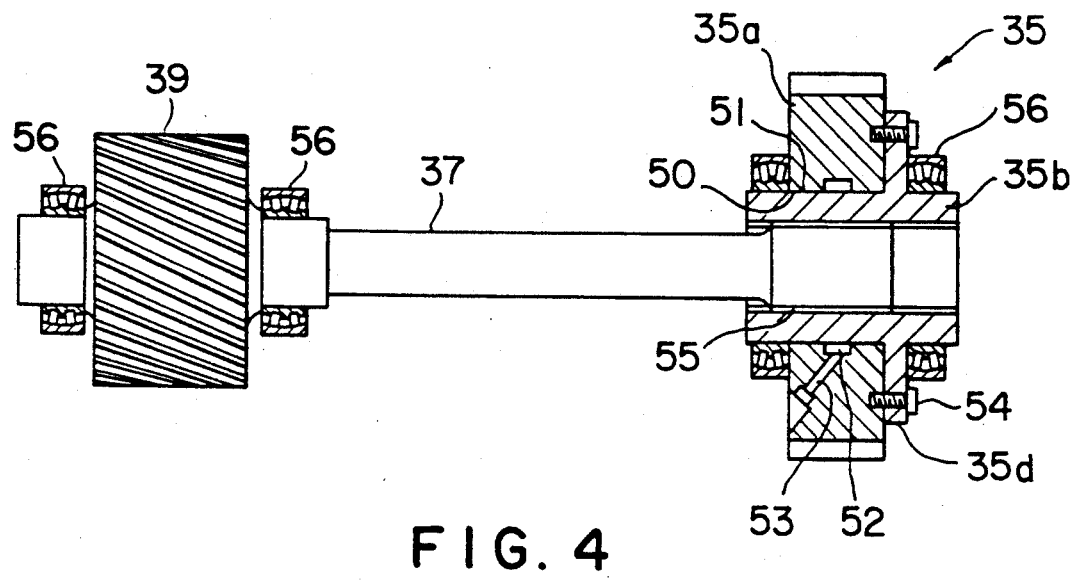
FIG. 4 is a partial enlarged sectional view of an idle gear on the side in which a meshing adjustment is made and respective idle gears.

As shown in FIG. 4, the idle plane gear 35 is constituted by a ring shaped gear 35a and a boss 35b. The ring shaped gear has its central opening 50 shrank fit to the outer periphery of the body 51 of the boss 35b, and an annular oil groove 52 is formed between the fit surfaces of the opening 50 and body 51.

High pressure oil is supplied to the oil groove 52 through an oil passage 53 formed in the ring shaped gear 35a or boss 35b from a source of oil pressure, not shown. Thus by applying a high oil pressure, the ring shaped gear 35a is expanded for permitting the ring shaped gear 35a to rotate about the body 51 of the boss 35b.

This construction enables a phase adjustment for uniformly dividing the driving force because two sets of gear transmission systems constituted by idle plane gears 35 and 36, idle helical teeth gears 39 and 40 and the idle shafts 37 and 38 uniformly mesh with the plane gear 34 and the helical gear 42. The phase adjustment is made by supplying high pressure oil to the oil groove 52 at the time of assembling the apparatus of this invention.

Reference numeral 54 denotes a reamer bolt or a knock pin which is secured after the phase adjustment has been made. The reamer bolt 54 is used to strongly secure together the ring shaped gear 35a and the boss 35b. The boss 35b is secured to the idle shaft 37 by means of a spline or a key 55. A bearing 56 is provided for receiving a thrust load.

Figure 6:
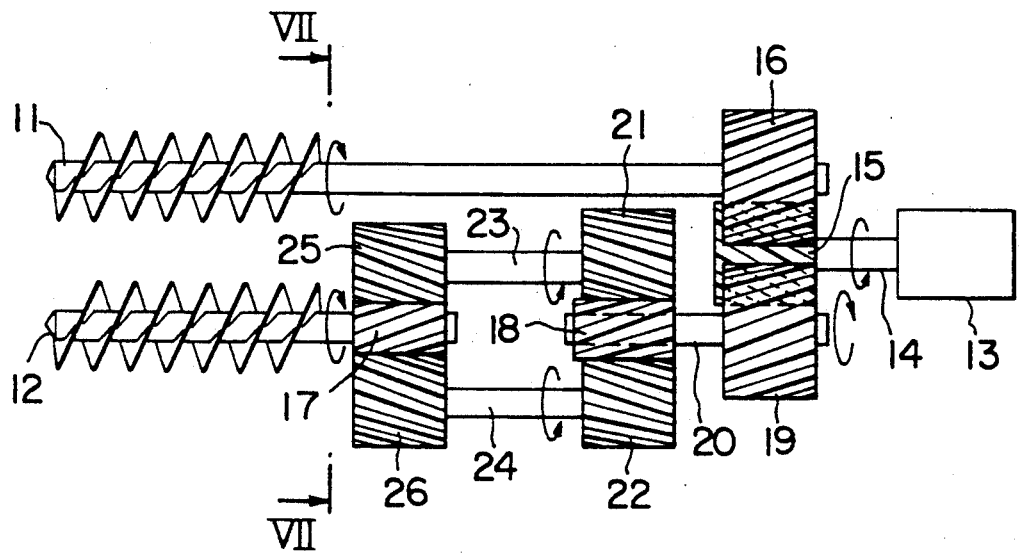
FIG. 6 is a schematic side view partly in section of the driving system of a prior art driving power transmitting apparatus of a twin shaft extruder.
Figure 7:
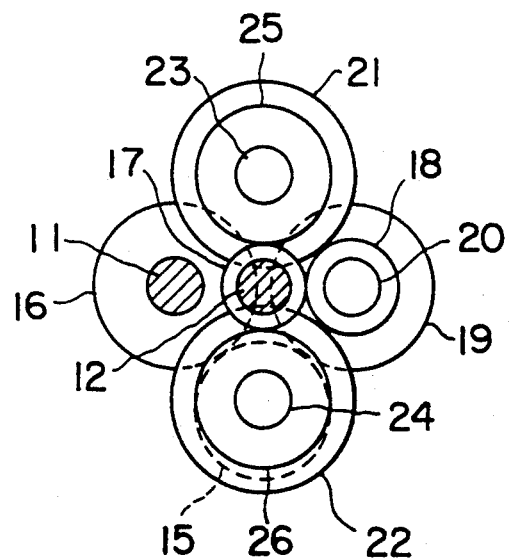
FIG. 7 is an enlarged sectional view taken along a line VII—VII in FIG. 6.

The apparatus of this invention operates as follows. The first screw 11 is driven by prime mover 30 through input shaft 31, the first coupling member 32a of the coupling unit 32 and the power transmitting shaft 33. The second screw 12 is driven by two sets of parallel gear transmission systems directly meshing with plane gear 34 rotated by the second coupling member 32b of the coupling unit 32, the gear 34 being rotatably disposed on the power transmitting shaft 33. The two sets of gear transmission systems are constituted by two idle plane gears 35 and 36, two idle shafts 37 and 38, two idle helical gears 39 and 40, and the helical gear 42 driven by the idle helical gears 39 and 40 at the same time. The number of gears is much smaller than that of the prior art shown in FIGS. 6 and 7.

The power transmission shaft 33 of the first screw 11 is connected to the coupling unit 32 and the plane gear 34 is also connected to the coupling unit 32 so that the driving power of the first screw 11 is not applied to the plane gear 34 with the result that the plane gear 34 would not be twisted by the driving force. For this reason, the teeth of the plane gear 34 and the idle plane gears 35 and 36 mesh smoothly.

Since gears 34, 35 and 36 are plane gears, no means is necessary for the plane gear 34 for receiving the thrust load which simplifies and make compact the supporting structure of the plane gear 34.

The idle plane gear 35 rotatably mounted on the idle shaft 37 for the purpose of adjusting the meshing phase has its boss 35b connected to the idle shaft not to rotate, and the ring shaped gear 35a is shrunk fit to the boss 35b. And also since the gear 35a is secured to the boss 35b by reamer bolt 54, there is no radial gap between the idle plane gear 35 and the idle shaft 37. For this reason, the idle plane gear 35 is not eccentrically mounted on the idle shaft 37 so that the driving force is positively transmitted and it is possible to decrease damage and wear of the idle plane gear 35 and other gears associated therewith, thereby elongating the useful life of the apparatus.

Since teeth of the helical gear 42 has the same direction of skew as a flight of the second screw 12, a portion of the thrust load of the second screw can be received by the idle helical gears 39 and 40 whereby the load of the thrust bearing 44 subjected to a high load can be decreased.

Figure 5:
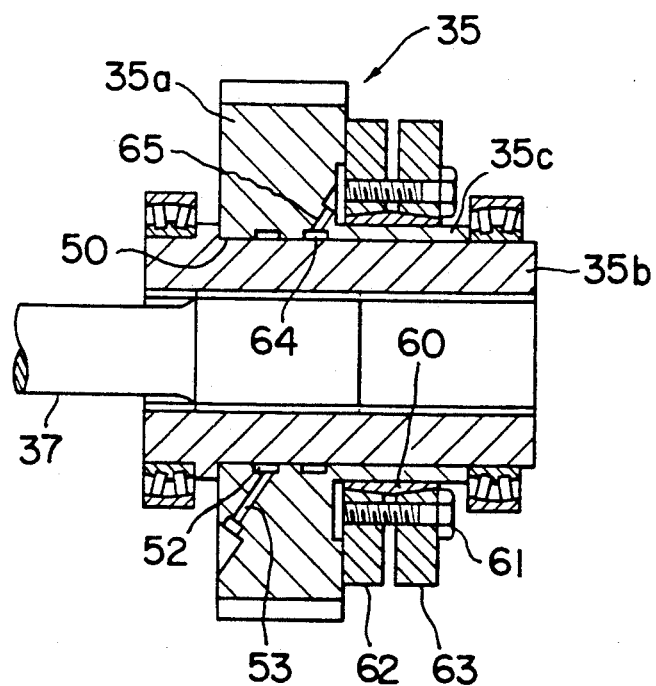
FIG. 5 is a partial enlarged sectional view showing another example of a meshing adjusting device.

FIG. 5 shows another example of the idle plane gear utilized for adjusting the phase. On the right hand side of opening 50 is projected a thin cylinder 35c loosely fit to the outer periphery of the boss 35b. The thin cylinder 35c is clamped by a clamping device constituted by two clamping rings 62 and 63 clamping a tapered ring 60 by bolts 61 so as to connect the thin cylinder 35c to the boss 35b by a frictional force.

When pressurized oil enters into the thin cylinder 35c from the oil groove 52, an oil film is formed to prevent firm connection, and oil seals or O rings 64 are provided between the thin cylinder 35c and the idle plane gear 35. Further, it is advantageous to provide an oil exhaust passage 65. However, when such substance which does not disturb friction such as volatile solvent is substituted for the pressurized oil, O ring 64 and oil exhaust passage 65 can be omitted.

As above described, according to this invention, the two screws of the twin shaft extruder can be efficiently driven by a power transmission system including a smaller number of gears than that of the prior art, and the apparatus can be constructed to be compact and can resist a high torque and not be expensive. Furthermore, at least one idle gear can be constructed with a ring shaped gear and a boss and the both are shrunk fit. Pressurized oil is supplied to the shrunk fit surfaces so as to permit relative rotation thereof. After adjusting the phase of meshing of the parallel two sets of gear transmission systems the two sets are interconnected so that an accurate driving power transmission can be made.

What is claimed is:

1. Driving power transmitting apparatus of a twin shaft extruder comprising:
   an input shaft rotated by a prime mover;
   first and second coupling members provided for one end of said input shaft;
   a power transmitting shaft coaxial with said input shaft, one end of said power transmitting shaft being connected to said input shaft through said first coupling member, the other end of said power transmitting shaft being connected to a first screw;
   a plane gear concentrically and rotatably mounted on said power transmitting shaft and connected to said input shaft through said second coupling member;
   two paired idle plane gears meshing with said plane gear;
   two parallel idle shafts each with one end of connected with said idle plane gears;
   two idle helical gears connected to the other ends of two idle shafts; and
   a helical gear connected to a drive end of a second screw paired with said first screw, said two idle helical gears meshing with said helical gear at substantially symmetrical positions, teeth of said helical gear being skewed in a same direction as a flight of said second screw.

2. The driving power transmitting apparatus according to claim 1, wherein at least one idle gear of said idle plane gears and said idle helical gears connected to each of said idle shafts comprises a ring shaped gear, said ring shaped gear has a central opening and a boss having a flange, said boss being shrunk fit to an inner wall of said central opening and fitted to and secured to one end of each of said idle shafts, wherein an oil groove extending in a peripheral direction is formed between said central opening and said boss fitted in said opening for supplying pressurized oil to said oil groove formed through said ring shaped gear enabling said ring shaped gear to rotate about said boss by loosening said shrink fit between said idle gear and said boss when pressurized oil is supplied to said oil groove, said ring shaped gear and said flange on said boss are interconnected by positioning means so as to make equal meshing of said two idle plane gears and said two idle helical gears to said plane gear and said helical gear.

3. The driving power transmitting apparatus according to claim 2 wherein a thin cylinder is integrally formed with one end of said ring shaped gear so as to couple said ring shaped gear with said boss by frictional force.

* * * * *